(12) United States Patent
Herring et al.

(10) Patent No.: US 10,691,931 B2
(45) Date of Patent: Jun. 23, 2020

(54) SENSOR-BASED ENVIRONMENT FOR PROVIDING IMAGE ANALYSIS TO DETERMINE BEHAVIOR

(71) Applicant: Toshiba Global Commerce Solutions Holdings Corporation, Tokyo (JP)

(72) Inventors: Dean Frederick Herring, Youngsville, NC (US); Brad Matthew Johnson, Raleigh, NC (US); Mark Edward Molander, Cary, NC (US)

(73) Assignee: Toshiba Global Commerce Solutions, Tokyo (JP)

( * ) Notice: Subject to any disclaimer, the term of this patent is extended or adjusted under 35 U.S.C. 154(b) by 38 days.

(21) Appl. No.: 15/724,497

(22) Filed: Oct. 4, 2017

(65) Prior Publication Data

US 2019/0102611 A1  Apr. 4, 2019

(51) Int. Cl.
*G06K 9/00* (2006.01)
*G06Q 30/02* (2012.01)
*G06F 3/042* (2006.01)

(52) U.S. Cl.
CPC ..... *G06K 9/00335* (2013.01); *G06K 9/00771* (2013.01); *G06Q 30/0201* (2013.01); *G06Q 30/0281* (2013.01); *G06F 3/0425* (2013.01)

(58) Field of Classification Search
CPC .......... G06K 9/00335; G06K 9/00771; G06K 2009/00328; G06K 2209/17; G06K 9/00221; G06K 9/00255; G06K 9/00288; G06K 9/00362; G06K 9/00536; G06K 9/00577; G06K 9/00624; G06K 9/209;
(Continued)

(56) References Cited

U.S. PATENT DOCUMENTS 8,606,645 B1  12/2013  Applefeld
9,153,074 B2  10/2015  Zhou et al.
(Continued)

OTHER PUBLICATIONS

Somerville, "A New Reality for Shoppers: Virtual and augmented technologies will help ease buying decisions," Contra Costa Times, Dec. 31, 2013, 7 pages.
(Continued)

*Primary Examiner* — Xin Jia
(74) *Attorney, Agent, or Firm* — Patterson + Sheridan, LLP (57) ABSTRACT

Method, computer program product, and system for use with an environment divided into a plurality of predefined regions. The method comprises acquiring first image information including a first person, determining location information for the first person, and identifying a first behavior of the first person from a plurality of predefined behaviors. The method further comprises performing a first predefined action responsive to identifying the first behavior. Performing the first predefined action comprises determining a first region of the plurality of predefined regions corresponding to the location information, and accessing a memory storing predefined relationship information between the plurality of predefined behaviors and the plurality of predefined regions. The predefined relationship information comprises a plurality of predefined actions. Performing the first predefined action further comprises selecting, using at least the first behavior and the first region, the first predefined action from the plurality of predefined actions.

20 Claims, 6 Drawing Sheets

(58) Field of Classification Search
CPC ...... G06K 9/46; G06K 9/6201; G06K 9/6267; G06K 9/78; G06Q 30/0201; G06Q 30/0281; G06Q 10/087; G06Q 20/18; G06Q 20/204; G06Q 20/208; G06Q 20/209; G06Q 20/322; G06Q 30/016; G06Q 30/0224; G06Q 30/0235; G06Q 30/0251; G06Q 30/0269; G06Q 30/0609; G06Q 30/0623; G06Q 30/0629; G06Q 30/0631; G06Q 30/0633; G06Q 30/0635; G06Q 30/0639; G06F 3/0425; G06F 1/163; G06F 3/012; G06F 3/013; G01B 11/00; G01B 11/02; G01G 19/40; G01G 19/4144; G01S 19/13; G06T 11/60; G06T 2207/30232; G06T 7/66; G07G 1/0045; G07G 1/0054; G07G 1/0063; G07G 1/0072; H04N 5/225; H04N 5/232; H04N 7/181

See application file for complete search history.

(56) References Cited

U.S. PATENT DOCUMENTS

| | | | |
|---|---|---|---|
| 2008/0169929 A1* | 7/2008 | Albertson | G08B 13/19613 340/573.1 |
| 2012/0209715 A1 | 8/2012 | Lotan et al. | |
| 2014/0161324 A1* | 6/2014 | Lee | G06K 9/00677 382/110 |
| 2014/0222501 A1* | 8/2014 | Hirakawa | G06Q 30/0201 705/7.29 |
| 2014/0363059 A1 | 12/2014 | Hurewitz | |
| 2014/0365336 A1 | 12/2014 | Hurewitz | |
| 2015/0030236 A1 | 1/2015 | Wilson et al. | |
| 2015/0112826 A1 | 4/2015 | Crutchfield, Jr. | |
| 2015/0192999 A1 | 7/2015 | Chirakan et al. | |
| 2015/0242943 A1 | 8/2015 | Abovitz et al. | |
| 2015/0341599 A1* | 11/2015 | Carey | H04N 7/181 348/150 |
| 2016/0019954 A1 | 1/2016 | Vaskivskyi et al. | |
| 2016/0063517 A1 | 3/2016 | Sorensen | |
| 2016/0110772 A1* | 4/2016 | Herring | G01G 19/4144 705/14.66 |
| 2016/0267577 A1 | 9/2016 | Crowder et al. | |
| 2017/0039613 A1 | 2/2017 | Kaehler et al. | |
| 2018/0018648 A1* | 1/2018 | Unnerstall | G06Q 20/18 |

OTHER PUBLICATIONS

Prysm, "Gesture Recognition," Computer Weekly News, Mar. 1, 2012, 6 pages.

* cited by examiner

| Behavior | Relevant Criteria | Region 405A | Region 405B | Region 405C |
|---|---|---|---|---|
| Behavior 345-1 (view item) | None | Action 375-1 | Action 375-1 | Action 375-1 |
| Behavior 345-2 | None | Action 375-2 | Action 375-3 | No action |
| Behavior 345-3 (access gesture) | Time (prior to) | No action | No action | Action 375-4 |
| Behavior 345-3 | Time (after) | No action | No action | Action 375-5 |
| ... | ... | ... | ... | ... |
| Behavior 345-n | Distance (less than) | Action 375-6 | Action 375-7 | Action 375-8 |
| Behavior 345-n | Distance (greater than) | No action | No action | No action |

FIG. 5A

| Behavior | Relevant Criteria | Region 405A | Region 405B | Region 405C |
|---|---|---|---|---|
| Behavior 345-1 (view item) | None | Action 375-1 | Action 375-9 | Action 375-1 |
| Behavior 345-2 | None | Action 375-2 | Action 375-10 | No action |
| Behavior 345-3 (access gesture) | Time (prior to) | No action | No action | Action 375-4 |
| Behavior 345-3 | Time (after) | No action | No action | Action 375-5 |
| ... | ... | ... | ... | ... |
| Behavior 345-n | Distance (less than) | Action 375-6 | Action 375-7 | Action 375-8 |
| Behavior 345-n | Distance (greater than) | No action | No action | No action |

SENSOR-BASED ENVIRONMENT FOR PROVIDING IMAGE ANALYSIS TO DETERMINE BEHAVIOR

BACKGROUND

The present disclosure relates to a sensor-based environment, and more specifically, to techniques for interpreting behaviors of person(s) in the environment using acquired imagery.

To facilitate understanding, identical reference numerals have been used, where possible, to designate identical elements that are common to the figures. It is contemplated that elements disclosed in one embodiment may be beneficially utilized on other embodiments without specific recitation. The illustrations referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

Aspects of the current disclosure relate to an integrated environment capable of providing a personalized, automated, and/or adaptive experience for person(s) within the environment. A number of different sensor devices may be employed within the environment, and networked with various computing devices such as point-of-sale (POS) terminals, digital signage, servers, and mobile or handheld computing devices to provide a seamless integration of mobile technologies and e-commerce into traditional experiences.

In some embodiments, a method is disclosed for use with an environment divided into a plurality of predefined regions. The method comprises acquiring, using one or more visual sensors disposed within the environment, first image information including a first person; determining, using one or more computer processors coupled with the one or more visual sensors, location information for the first person within the environment; identifying, using the one or more computer processors, a first behavior of the person using image analysis performed on the first image information, the first behavior selected from a plurality of predefined behaviors; and performing a first predefined action responsive to identifying the first behavior. Performing the first predefined action comprises: determining a first region of the plurality of predefined regions corresponding to the location information; accessing a memory storing predefined relationship information between the plurality of predefined behaviors and the plurality of predefined regions, wherein the predefined relationship information comprises a plurality of predefined actions; and selecting, using at least the first behavior and the first region, the first predefined action from the plurality of predefined actions.

The techniques discussed herein enable a sensor-based environment, in which behaviors performed by person(s) in the environment are interpreted using a spatial context and/or a personal context. Beneficially, such an approach provides a customizable and/or adaptive experience for person(s) in the environment, which can improve satisfaction with the experience.

While generally discussed within the context of a shopping environment, such as a retail store or other commercial environment, it is contemplated that the techniques disclosed herein may be applied to other environments (some non-limiting examples include libraries, museums, classrooms, hospitals, etc.) to provide a similar experience for persons included therein.

Figure 1:
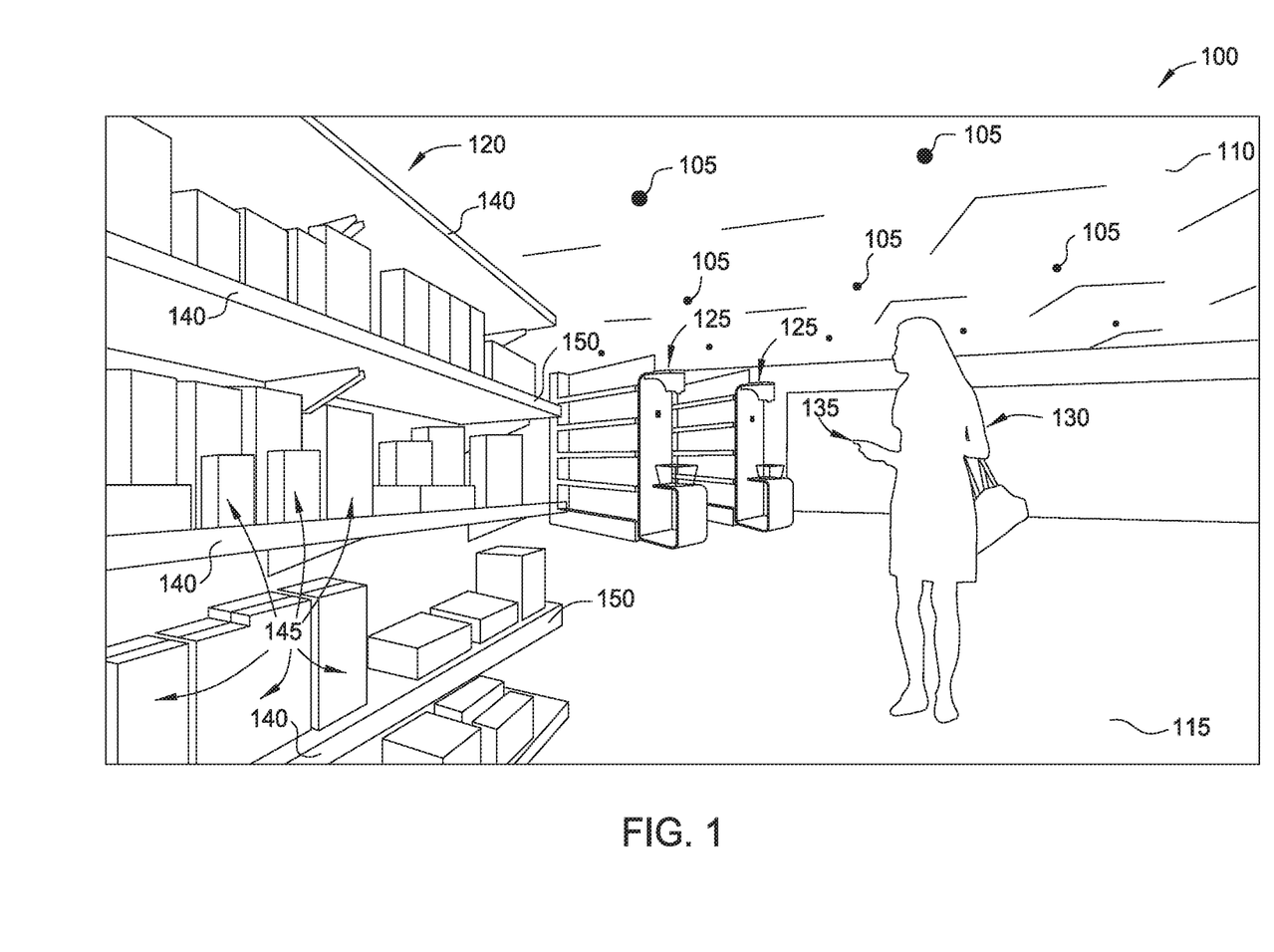
FIG. 1 illustrates an exemplary environment including a plurality of items, according to one or more embodiments.

FIG. 1 illustrates an exemplary environment 100 including a plurality of items, according to one or more embodiments. The environment 100 includes a plurality of sensor modules 105 disposed in the ceiling 110 of the environment 100. The sensor modules 105 may each include one or more types of sensors, such as video sensors (e.g., cameras), audio sensors (e.g., microphones), and so forth. Sensor modules 105 may also include actuating devices for providing a desired position and/or orientation of the included sensor(s). Generally, the sensor modules or individual sensors may be disposed at any suitable location within the environment 100. Some non-limiting examples of alternative locations include below, within, or above a floor 115 of the environment 100, within other structural components of the environment 100 such as a shelving unit 120 or walls, and so forth. In some embodiments, sensors may be disposed on, within, or near item display areas such as the shelving unit 120. The sensors may be oriented toward expected locations of personal interactions with items in order to acquire better data about the person's interactions, such as determining the person's field of view relative to certain items, updating a virtual cart or transaction record for the person's transaction in the environment 100, and so forth.

The environment 100 also includes a number of computer-based terminals (or kiosks) 125. Generally, terminals 125 may be configured for performing customer checkout and/or other functions, such as providing information to a customer or employee. Each terminal 125 may each include a discrete computing device or portions of a computing system, and may include various I/O devices, such as visual displays, audio speakers, cameras, microphones, etc. for interacting with various persons such as customers and/or employees. In some embodiments, a person 130 in the environment may have a mobile computing device, such as a smartphone 135, that communicatively couples with the terminal 125 for completing a checkout transaction. For example, the person's smartphone 135 may include payment information, identification information, etc. that facilitate completion of the checkout transaction. In one embodiment, the mobile computing device may execute a store application that connects with the computing system of the environment (e.g., to store servers or other computing devices through the Internet). In one embodiment, the mobile computing device may be directly connected with kiosk 125 through wireless networks established within the environment (e.g., over Wi-Fi or Bluetooth). In one embodiment, the mobile computing device may couple with the kiosk 125 when brought within range, e.g., using Bluetooth or near-field communication (NFC).

The environment 100 also includes one or more shelving units 120 having shelves 140 that support various store items 145. Though not shown, multiple shelving units 120 may be disposed in a particular arrangement in the environment 100, with the space between adjacent shelving units forming aisles through which customers and employees may travel. For example, customers may navigate the aisles and/or approach the shelving units 120 to view items 145 included therein, to handle the items, to select the items, etc. In another example, employees may navigate the aisles and/or approach the shelving units 120 to view stock levels of the items 145, to determine out-of-place items, etc. In some embodiments, shelving units 120 may include visual sensors or other sensor devices or I/O devices. The sensors or devices may couple with the person's smartphone 135 and/or other networked computing devices (including terminals 125 and/or servers) that are associated with the environment 100. For example, the front portions 150 of shelves 140 may include video sensors oriented outward from the shelving unit 120 (i.e., toward the aisle) to acquire image information for a person's interactions with items 145 on the shelving unit 120, with the image information provided to back-end servers for storage and/or analysis. In some cases, some or all of the image information may also be accessible by a person's mobile computing device. In some embodiments, portions of the shelving unit 120 (such as the front portions 150 of shelves 140) may include indicator lights or other visual display devices or audio output devices that are able to communicate with a person.

During an exemplary transaction in the environment 100, the person 130 may have a shopping receptacle in which the person places items after they are selected for purchase. Examples of shopping receptacles include shopping carts, baskets, or other containers that may be carried or otherwise transported by the person during the transaction. Upon completion of the transaction—for example, the person has selected all of the desired items—the person may approach one of the terminals 125 or a designated checkout area to perform a checkout transaction.

In some cases, the checkout transaction may have "touch-less" aspects or may be entirely touchless. For example, visual sensors included in the environment and/or within the approached terminal 125 may acquire image information that is usable to identify the person, items included within the shopping receptacle, etc. and that streamlines or otherwise facilitates the checkout transaction. The image information may be used to detect one or more predefined behaviors when performed by person(s) in the environment 100. As will be discussed further herein, logic may be applied to interpret the detected behaviors using a spatial context and/or a personal context. Beneficially, such an approach provides a customizable and/or adaptive experience for person(s) in the environment, which can improve satisfaction with the experience. For example, by improving an accuracy of detected behaviors for individual persons in the environment 100 (e.g., better matching an intent of the person(s)), the person may more effectively complete their transaction (e.g., with less difficulty or frustration) and/or spend a shorter time completing their transaction within the environment 100.

Figure 2:
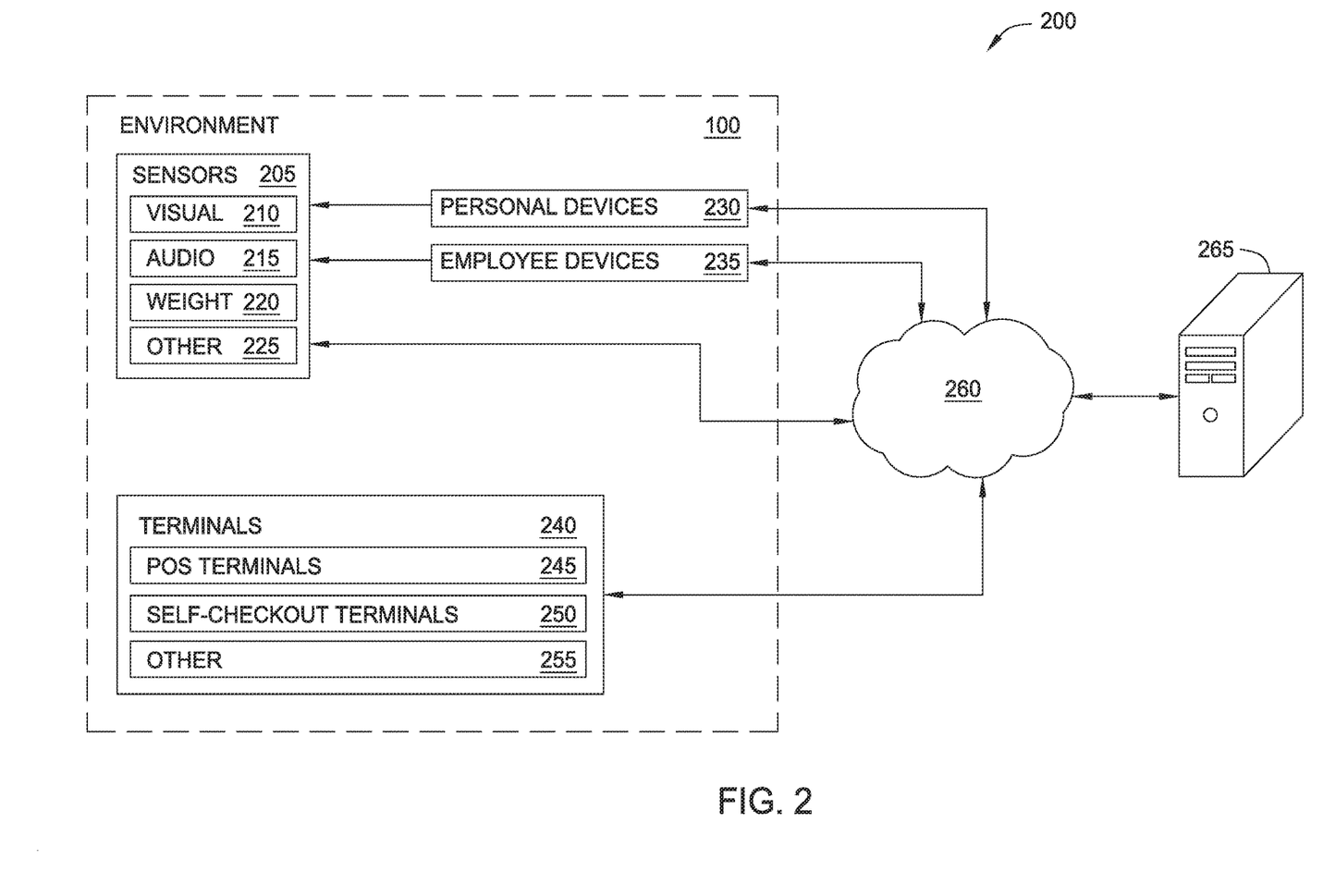
FIG. 2 illustrates an exemplary system for interpreting behaviors of one or more persons in a sensor-based environment, according to one or more embodiments.

FIG. 2 illustrates an exemplary system 200 for interpreting behaviors of one or more persons in a sensor-based environment, according to one or more embodiments. The system 200 may be used in conjunction with other embodiments disclosed herein, such as the environment 100 described in FIG. 1. The system 200 includes a number of components that are disposed within the environment 100. The system may also include components that are outside the environment—for example, a server 265 may be located remotely or proximately disposed to the environment (such as within a back room in the same building that is not accessible by customers).

Components within the environment include one or more sensors 205 of various types, such as visual sensors 210, audio sensors 215, and weight sensors 220. The sensors 205 may also include other sensors 225 capable of providing meaningful information about personal interactions within the environment, e.g., location sensors. The sensors 205 may be discrete sensor devices deployed throughout the environment 100 in fixed and/or movable locations. Sensors 205 may be statically included in walls, floors, ceilings, displays, or other non-sensor devices, or may be included in shopping receptacles capable of being transported through the environment. For example, weight sensors 220 may be disposed in fixed locations within the environment, such as within the floor or within a surface of a checkout terminal, and may also include load cells or other sensors disposed in a basket portion of a shopping receptacle. In one embodiment, sensors 205 may include adjustable-position sensor devices, such as motorized cameras (i.e., an example of visual sensors 210) attached to a rail, wire, or frame. In one embodiment, sensors 205 may be included on one or more unmanned vehicles configured to travel through some or all of the environment 100, such as unmanned ground vehicles (UGVs) or unmanned aerial vehicles (UAVs or "drones"). Sensors 205 may also include sensor devices that are included in computing devices associated with the environment 100, such as personal devices 230, employee devices 235, and terminals 240. In some cases, the computing devices (or the component sensor devices) may be implemented as body-worn or carried devices.

Personal devices 230 and employee devices 235 may each include passive or actively-powered devices capable of communicating with at least one of the networked devices of system 200. One example of a passive device (which may be worn or carried) is a NFC tag. Active devices may include mobile computing devices, such as smartphones or tablets, or wearable devices such as a Google Glass™ interactive eyepiece (Glass is a trademark of Google Inc.). The personal devices 230 generally denotes ownership or possession of the devices by customers within the environment 100, while the employee devices 235 denotes ownership or possession by the retailer or other administrator of the environment 100. In some cases, employee devices 235 may be carried by employees and used in the course of their employment. Personal devices 230 and employee devices 235 may execute applications or other program code that generally enables various functions and features accessible using server 265 and/or other networked computing devices. In some embodiments, sensor devices that are included with the personal devices 230 or employee devices 235 may be included in the sensors 205.

System 200 includes a plurality of terminals 240 within the environment 100. Terminals 240 generally include any structure that is capable of receiving input from and/or producing output to people (e.g., customers, employees) within the environment 100. The terminals 240 may include computing systems, portions of computing systems, or devices controllable by computing systems. In one example, a terminal 240 may include a computing device that is communicatively coupled with a visual display and audio speaker(s), as well as being communicatively coupled with one or more input devices. In another example, a terminal 240 may include a visual display and associated driver hardware, but a computing device coupled to the terminal and providing data for display is disposed separately from the terminal. In some embodiments, terminals 240 may be implemented as standalone devices, such as a kiosk disposed on the store floor or monolithic device disposed on a shelf or platform. In some embodiments, terminals 240 may be integrated partially or wholly with other components of the environment 100, such as input or output devices included with shelving or other structural components in the environment (e.g., components used for product display or storage). In some embodiments, terminals 240 may be modular and may be easily attachable and detachable to elements of the environment 100, such as the structural components.

Generally, terminals 240 may be distributed throughout the environment 100 and may enhance various phases of the person's transactions within the environment. For example, terminals 240 may include digital signage (i.e., included as an example of other terminals 255) disposed throughout the environment, such as included in or near aisles, endcaps, displays, and/or shelving in the environment. A person during a transaction may view and/or interact with the digital signage as he or she moves throughout the environment. The digital signage may be included in a static display or may be movable, such as including digital signage within a shopping receptacle. Terminals 240 may also include one or more types of terminals usable for completing checkout transactions, such as employee-manned POS terminals 245 and self-checkout terminals 250. In some cases, the terminals 240 that provide checkout functionality may be disposed within a designated checkout area within the environment 100.

In some embodiments, terminals 240 may provide an integrated functionality. For example, terminals 240 may function in a first mode as digital signage, and when engaged by a person (i.e., receiving input from the person), the terminals function in a second mode as a self-checkout terminal or other type of terminal.

Server 265 generally includes processor(s), memory, and communications capabilities and may perform various computing tasks to support the operation of the environment 100. Server 265 may communicate using various wired and/or wireless communications methods with terminals 240, sensors 205, and with other networked devices such as personal devices 230 and employee devices 235. Server 265 generally executes computer program code in which input data is received from networked devices, the input data is processed and/or stored by the servers, and output data is provided to networked devices for operation of the environment 100.

Network 260 may include one or more networks of various types, including a local area or local access network (LAN), a general wide area network (WAN), and/or a public network (e.g., the Internet). In one embodiment, various networked computing devices of the system 200 are interconnected using a LAN, and one or more computing devices (e.g., server 265, personal devices 230) include connections to the Internet.

Figure 3:
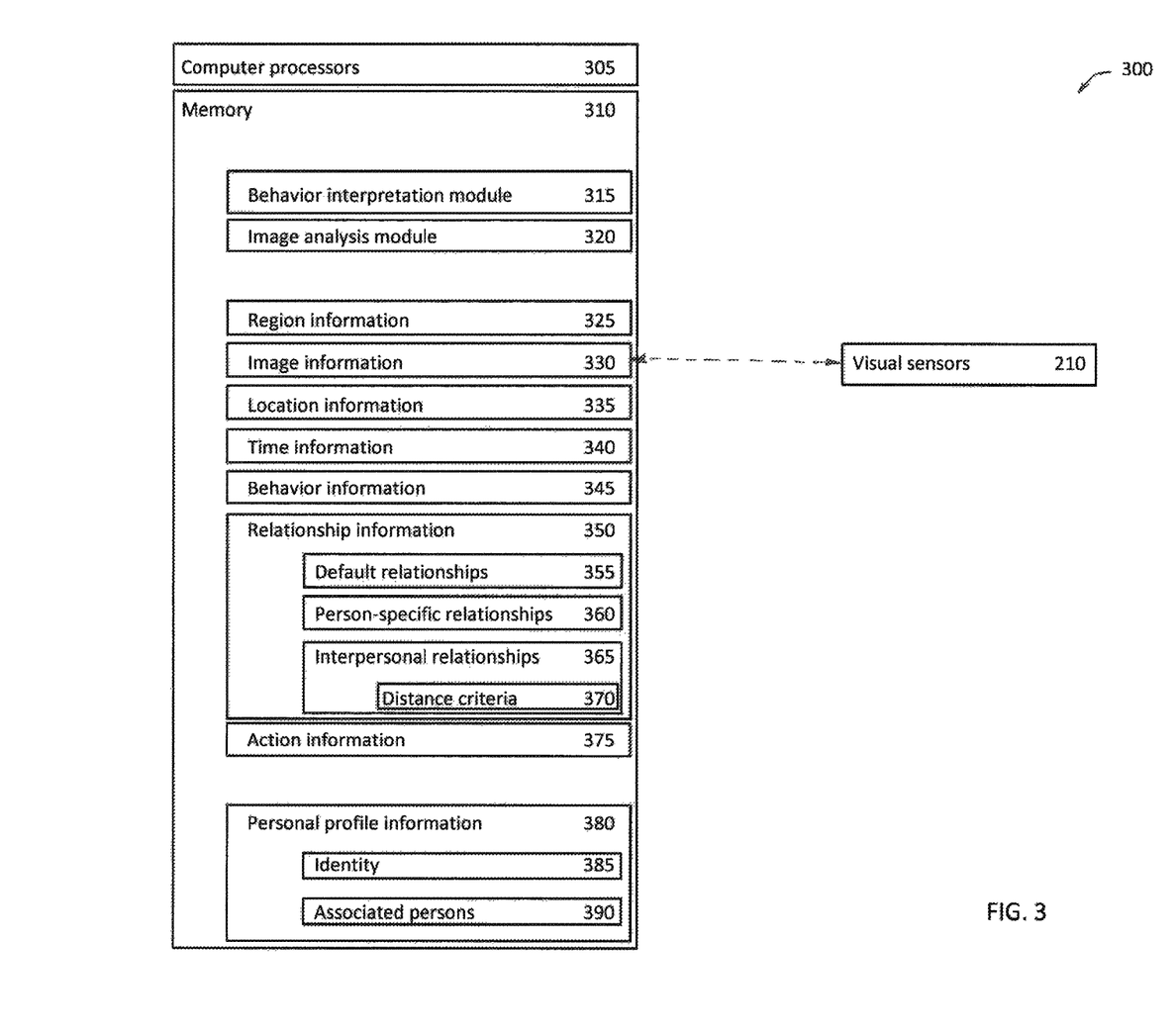
FIG. 3 is a block diagram illustrating exemplary operation of a system for interpreting behaviors of one or more persons in a sensor-based environment, according to one or more embodiments.

FIG. 3 is a block diagram illustrating exemplary operation of a system 300 for interpreting behaviors of one or more persons in a sensor-based environment, according to one or more embodiments. The system 300 may be used in conjunction with other embodiments disclosed herein, such as the environment 100 described in FIG. 1.

The system 300 includes one or more computer processors 305 communicatively coupled with a memory 310, which may be embodied in any suitable configuration. In one embodiment, the one or more computer processors 305 and the memory 310 are included in a singular computing device. In another embodiment, the one or more computer processors 305 and the memory 310 are distributed among a plurality of discrete computing devices that are networked together.

The one or more computer processors 305 may include any processing element suitable for performing functions described herein, and may include single or multiple core processors, as well as combinations thereof. The computer processors 305 may be included in a single computing device, or may represent an aggregation of processing elements included across a number of networked devices such as the personal devices 230, terminals 240, etc. discussed above with respect to FIG. 2.

The memory 310 may include a variety of computer-readable media selected for their size, relative performance, or other capabilities: volatile and/or non-volatile media, removable and/or non-removable media, etc. Memory 310 may include cache, random access memory (RAM), storage, etc. Storage included as part of memory 310 may typically provide a non-volatile memory for the networked computing devices (e.g., server 265), and may include one or more different storage elements such as Flash memory, a hard disk drive, a solid state drive, an optical storage device, and/or a magnetic storage device. The memory 310 may be included in a single computing device or may represent an aggregation of memory included in networked devices.

The memory 310 may include a plurality of "modules" for performing various functions described herein. Each module generally includes program code that is executable by one or more of the computer processors 305. As shown, the memory 310 comprises a behavior interpretation module 315 and an image analysis module 320, although other combinations of modules are possible. Individual modules may also interact to perform certain functions. For example, the behavior interpretation module 315 may make calls to the image analysis module 320 to determine whether a person has performed a predefined behavior to be interpreted. The person of ordinary skill will recognize that the modules provided here are merely non-exclusive examples; different functions and/or groupings of functions may be included as desired to suitably operate the system 300 within the environment.

Although not shown, the system 300 may include one or more output devices communicatively coupled with the one or more computer processors 305. The output devices include one or more devices suitable for presenting information to person(s) in the environment, and generally include audio and/or visual output devices. The audio output devices may include conventional audio speakers having any suitable form factor (e.g., standalone, integrated in a stereo, headphones, etc.), as well as devices using alternative methods of producing sound perceptible by a person, such as bone conduction transducers in a body-worn device. The visual output devices may include visual displays and various visual indicators such as light emitting diodes (LEDs). In some embodiments, the terminals 240, personal devices 230, and employee devices 235 depicted in FIG. 2 may include the visual devices and/or the audio devices for communicating with persons during their transactions. Other output devices may provide information to customers through tactile feedback (e.g., haptic devices) or using other sensory stimuli.

Although not shown, the system 300 may include one or more sensors of different types, which are communicatively coupled with the one or more computer processors 305. The one or more sensors may be carried or body-worn, and/or distributed (fixed and/or movable) throughout the environment. The one or more sensors may include the one or more visual sensors 210, which may be used to capture image information 330 corresponding to one or more portions of the environment, which at various times may include one or more persons. The image information 330 may include views from various perspectives. The image information 330 may be stored in the memory 310, and may be individually or collectively processed by the computer processors 305 to determine information about person(s) within the environment, interactions with various items included in the environment, and so forth. Other sensors may also be included within the system 300 that are suitable for collecting information about person(s) and interactions within the environment. Some non-limiting examples of other sensors include infrared (IR) sensors, thermal sensors, weight sensors, capacitive sensors, magnetic sensors, sonar sensors, radar sensors, lidar sensors, and so forth.

Although not shown, the system 300 may also include input devices communicatively coupled with the one or more computer processors 305 and suitable for receiving input from person(s) in the environment. Some non-limiting examples of input devices include cameras, keyboards or keypads, touchscreens, buttons, inertial sensors, and so forth.

The image analysis module 320 is configured to receive the image information 330 as input, and to perform analysis of the image information 330 according to any suitable techniques. In some cases, the image analysis module 320 may perform edge detection or comparable techniques to define areas within the image information 330 that correspond to different person(s), item(s) within the environment, and so forth. The image analysis module 320 may further compare the image information 330 with reference image information to attempt to identify the detected person(s) or item(s). For example, the image analysis module 320 may compare the image information 330 with image information stored in personal profile information 380 to establish an identity 385 of a particular person in the environment.

The image analysis module 320 may further be able to detect one or more predefined behaviors (shown as behavior information 345) that are performed by one or more persons in the environment. Individual behaviors may be performed relative to particular item(s) in the environment or may be performed independently of any item(s). Additionally, individual behaviors may be performed by an individual person or may be performed by a combination of multiple persons. Some non-limiting examples of behaviors that are performed relative to a particular item include viewing the item, reaching for the item, handling the item, replacing an item on a shelf, and purchasing the item. Some non-limiting examples of behaviors that are performed independent of an item include hand gestures, shrugging shoulders, touching the person's face, and various facial expressions. Other non-limiting examples of behaviors include reaching toward or otherwise engaging a security device to access a secured region of the environment.

In some embodiments, the behavior interpretation module 315 is configured to interpret the detected behaviors of the behavior information 345 according to predefined relationship information 350. The relationship information 350 correlates the behavior information 345 with one or more factors, and specifies one or more predefined actions to perform for particular combinations of individual behaviors and the one or more factors.

As will be discussed further, the relationship information 350 comprises a plurality of predefined actions (shown as action information 375) that may be performed by the system 300 responsive to particular behaviors. Individual actions may include updating information included in the memory 310, communicating control signals to one or more other devices that are communicatively coupled with the system 300, and/or communicating other information to the one or more other devices. In one non-limiting example, responsive to a detected behavior by a particular person the system 300 updates personal profile information 380 associated with the person. In another non-limiting example, responsive to a detected behavior the system 300 communicates control signals to operate a security device to permit access to a secured region of the environment. In yet another non-limiting example, responsive to a detected behavior of a customer the system 300 transmits information to an external computing device to provide suitable assistance to a customer. In some cases, the external computing device may be associated with an employee to prompt the employee to provide the assistance to the customer.

In some embodiments, the environment is divided (or partitioned) into a plurality of predefined regions (shown as region information 325). Individual regions may correspond to any suitable categorical divisions, such as different categories of items that are available in different regions, different functions, different security requirements, and so forth. In some embodiments, some or all of the plurality of predefined regions correspond to different visual sensors 210. Location information 335 for the person(s) performing the behaviors may be determined using the image analysis module 320 and/or a predefined association of the visual sensors 210 with the regions defined in the region information 325.

In some embodiments, the relationship information 350 correlates the behavior information 345 with the location information 335. For example, based on the location information 335, different predefined actions may be performed responsive to a same behavior performed by a person. In one embodiment, when the location information 335 indicates that the person is in a first region of the plurality of regions, a first predefined action is performed responsive to the behavior. When the location information 335 indicates that the person is in a second region of the plurality of regions, a second predefined action is performed responsive to the behavior. In some embodiments, the relationship information 350 specifies, for the same detected behavior, that no action is to be performed when the location information indicates that the person is in a third region of the plurality of regions.

In some embodiments, the predefined action that is performed responsive to a detected behavior may be selected using time information 340 associated with a time that the behavior is performed. For example, when the time information 340 indicates the time is before a predefined time criteria, a first predefined action is performed. When the time information 340 indicates the time is after the predefined time criteria, a second predefined action is performed. In one embodiment, the system 300 generates control signals for a security device, such that the security device is locked (or an associated secured region otherwise inaccessible) before a particular time of day, and is unlocked (or the secured region otherwise accessible) after the time of day. Such an embodiment may be used, e.g., to comply with "blue" laws restricting alcohol sales to certain times.

In some embodiments, the relationship information 350 includes one or more default relationships 355 between the behavior information 345 with the one or more factors (e.g., location information 335, time information 340). The relationship information 350 may further include one or more person-specific relationships 360 that override (or take precedence over) corresponding default relationships 355. The relationship information 350 may further include one or more interpersonal relationships 365, which in some cases may override (or take precedence over) corresponding default relationships 355. The person-specific relationships 360 may be specific to a person and may be stored in the personal profile information 380 corresponding to the person. The person-specific relationships 360 may be specified using direct input from the person, and/or may be adaptively determined by the system responsive to behavior(s) of the person.

The interpersonal relationships 365 may be selectively enabled when a first person is located within a predefined distance (shown as a distance criteria 370) of a second person. For example, a customer (first person) may be paired with a store associate (second person) to enable one or more interpersonal relationships 365 and one or more corresponding actions. For example, a behavior of the store associate pointing to the customer and then to a product may correspond to the action of storing the product information with the customer relative to the store associate (e.g., for calculating a commission for the store associate). Another example behavior may provide an added benefit to the customer, such as adding a coupon or credit to the customer's account. If the distance between the store associate and customer is increased to greater than the distance criteria, the interpersonal relationships 365 may be disabled.

The personal profile information 380 includes an identify 385 of the person associated with the profile, and may further include one or more associated persons 390. In some embodiments, the relationship information 350 (including person-specific relationship 360 and/or interpersonal relationships 365) for a first person associated with the personal profile information 380 may be applied to a second person from the associated persons 390. For example, the relationship information 350 corresponding to an adult accountholder may be applied to a non-accountholder, such as an associated child.

Figure 4:
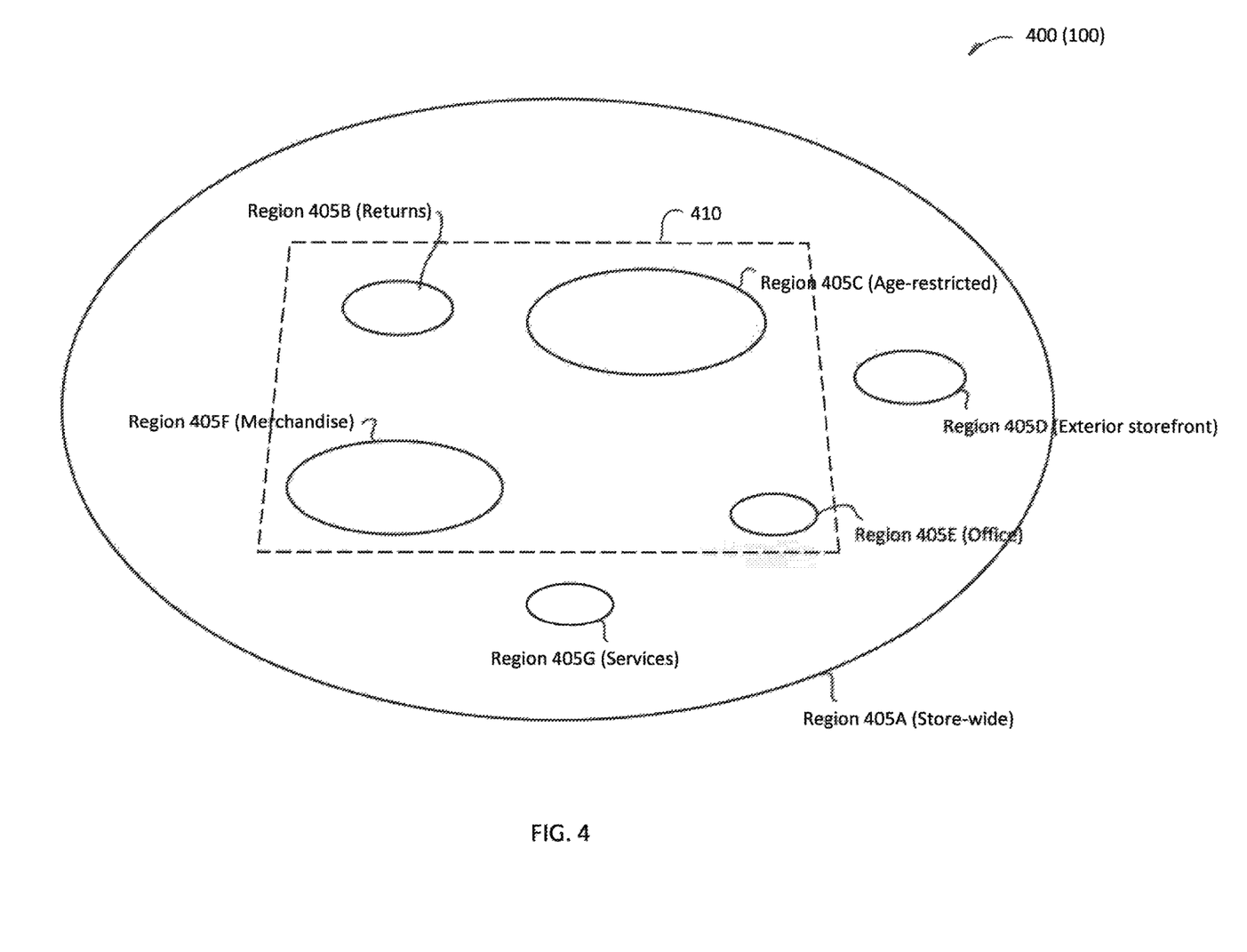
FIG. 4 illustrates a floor plan for an exemplary environment, according to one or more embodiments.

FIG. 4 illustrates a floor plan 400 for an exemplary environment, according to one or more embodiments. The floor plan 400 may be used in conjunction with other embodiments disclosed herein, such as the environment 100 described in FIG. 1. Within the floor plan 400, a plurality of regions 405A, 405B, . . . , 405G (generically referred to as region 405) are depicted relative to a footprint 410 of a building. In some cases, each region 405 may correspond specifically to one or more respective visual sensors. The regions 405 may be overlapping or non-overlapping. Assuming that the floor plan 400 corresponds to an exemplary retail environment, region 405A corresponds to a store-wide region, region 405B corresponds to a returns region, region 405C corresponds to an age-restricted region (e.g., sales of alcohol or sensitive materials, expensive items, etc.), region 405D corresponds to an exterior storefront region, region 405E corresponds to an office region, region 405F corresponds to a merchandise region, and region 405G corresponds to a services region.

In embodiments described herein, the relationship information 350 (FIG. 3) may specify different actions to be performed for a same behavior, when performed in different regions 405. For example, to indicate that a person intends to return an item in the region 405B (returns), the person performs a behavior by waving the item in the air. The system may respond by communicating information to a store associate for assistance with the return, performing an operation to automatically complete the return and credit the person's account, communicating information to display devices proximate to the person's location to provide guidance for completing the return, and so forth. In the region 405F (merchandise), the behavior of the person waving the item in the air indicates that the person seeks assistance with the item. The system may respond by communicating information to a store associate for assistance with the item, communicating information to display devices proximate to the person's location to provide assistance information or prompt the person to clarify the assistance request, and so forth.

Figure 5A:
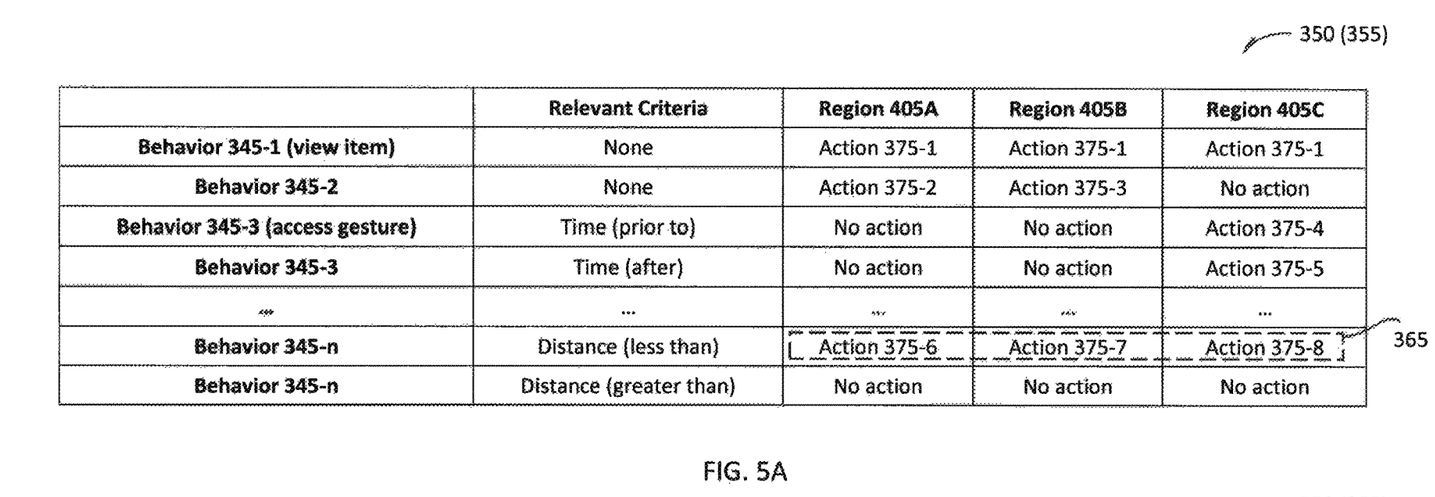
FIGS. 5A and 5B illustrate exemplary predefined relationship information between a plurality of predefined behaviors and a plurality of predefined regions of the environment, according to one or more embodiments.
Figure 5B:
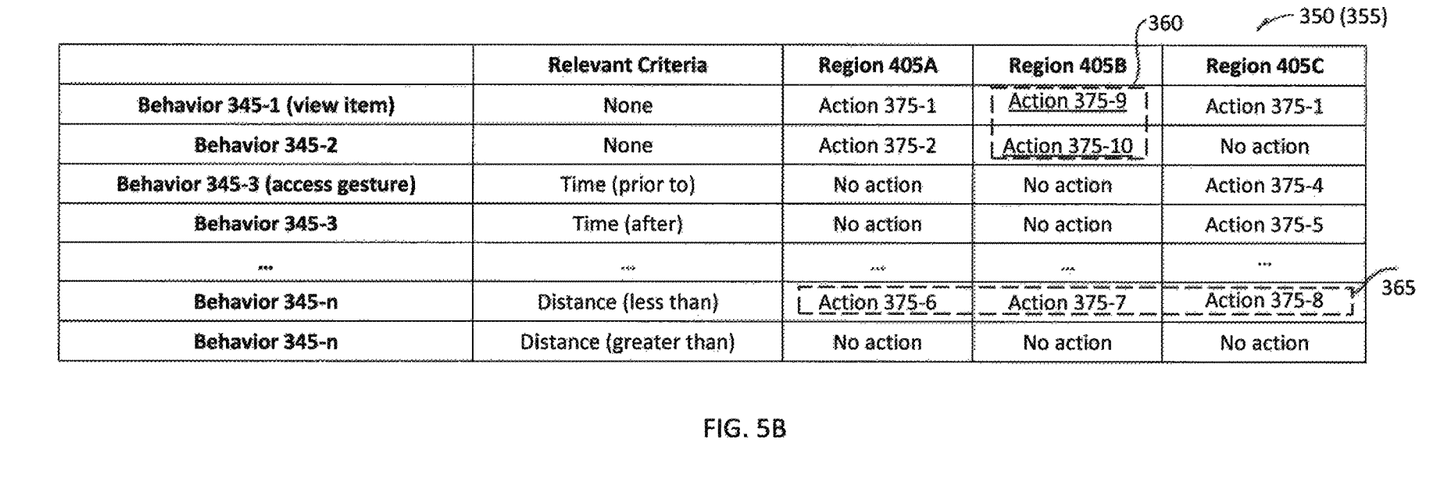

FIGS. 5A and 5B illustrate exemplary predefined relationship information 350 between a plurality of predefined behaviors and a plurality of predefined regions of the environment, according to one or more embodiments. The relationship information 350 may be used in conjunction with other embodiments disclosed herein, such as the environment 100 described in FIG. 1.

As shown, the relationship information 350 includes behaviors 345-1, 345-2, . . . , 345-n (generically referred to as behaviors 345), one or more relevant criteria, and a plurality of regions 405A, 405B, and 405C. The relationship information 355 indicates a plurality of predefined actions to be performed for particular combinations of behaviors 345, the regions 405, and/or the relevant criteria.

In some embodiments, a particular behavior 345 corresponds to a same action for different regions. As shown, behavior 345-1 corresponds to the person viewing an item. In each of regions 405A, 405B, 405C, behavior 345-1 corresponds to a same action 375-1, such as updating a historical aspect of personal profile information of the person. In other embodiments, a particular behavior 345 corresponds to different actions for different regions. As shown, behavior 345-2 corresponds to a first action 375-2 in region 405A, to a second action 375-3 in region 450B, and to no action in region 405C.

In some embodiments, a particular behavior 345 corresponds to different actions for different values of the relevant criteria. As shown, behavior 345-3 corresponds to an access gesture for a security device. In regions 405A, 405B (generally not including such a security device), the behavior 345-3 corresponds to no action. In region 405C, the behavior 345-3 corresponds to an action 375-4 prior to a time criteria, and to an action 375-5 after the time criteria. For example, action 375-4 may correspond to transmitting a locking control signal to the security device. Action 375-5 may correspond to transmitting an unlocking control signal to the security device, and/or performing an operation such as image analysis of acquired image information to verify the identity, age information, etc. of the person.

In some embodiments, a particular behavior 345-n corresponds to interpersonal relationships 365. For distances between a first person and a second person less than a distance criteria, the behavior 345-n corresponds to a first action 375-6 in region 405A, a second action 375-7 in region 405B, and a third action 375-8 in region 405C. For distances greater than the distance criteria, no action is taken in any of the regions 405A, 405B, 405C. In this manner, the interpersonal relationships are enabled responsive to determining the first person and the second person are located within a predefined distance.

In some embodiments, a person may have one or more person-specific relationships 360 that are configured to override the one or more default relationships 355. As shown in FIG. 5B, action 375-1 is replaced by action 375-9 for behavior 345-1 in the region 405B. Action 375-3 is replaced by action 375-10 for behavior 345-2 in the region 405B.

Figure 6:
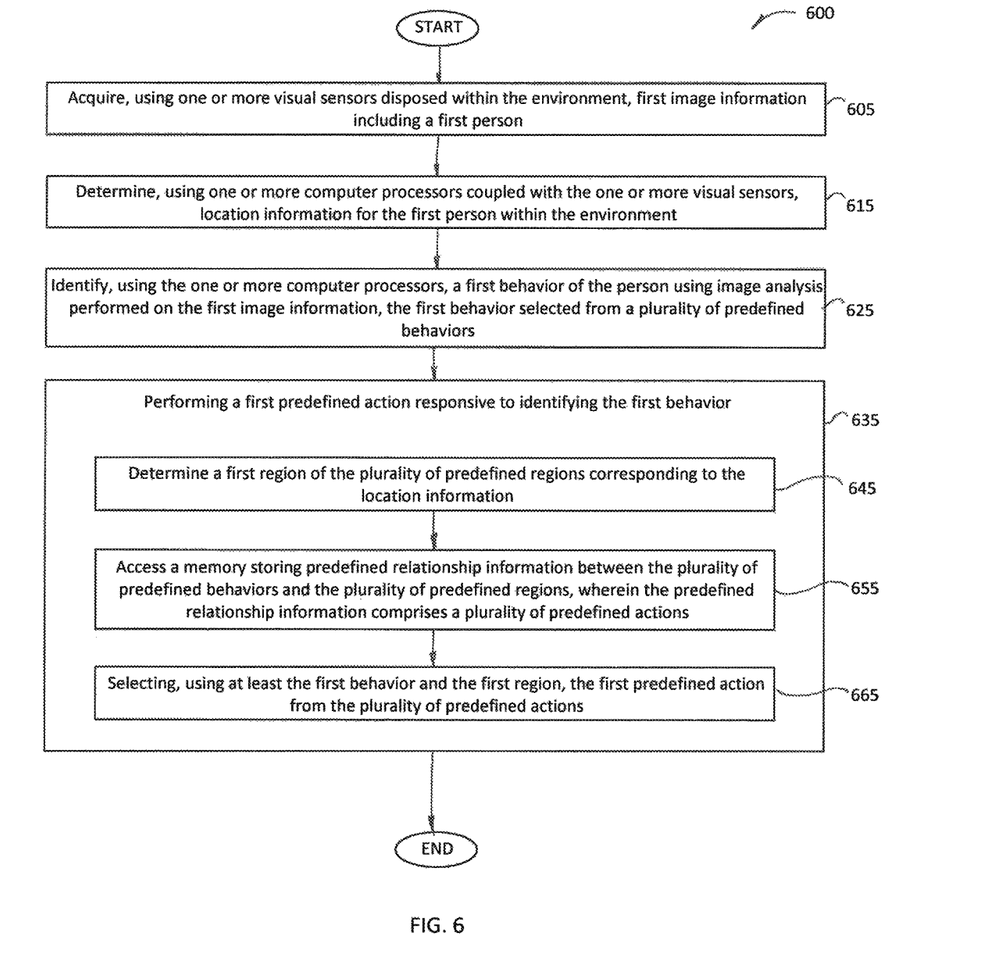
FIG. 6 illustrates a method for use with an environment divided into a plurality of predefined regions, according to one or more embodiments.

FIG. 6 illustrates a method 600 for use with an environment divided into a plurality of predefined regions, according to one or more embodiments. The method 600 may be used in conjunction with other embodiments disclosed herein, such as the environment 100 described in FIG. 1, the system 300 described in FIG. 3, etc.

Method 600 begins at block 605, where the system acquires, using one or more visual sensors disposed within the environment, first image information including a first person. At block 615, the system determines, using one or more computer processors coupled with the one or more visual sensors, location information for the first person within the environment. At block 625, the system identifies, using the one or more computer processors, a first behavior of the person using image analysis performed on the first image information. The first behavior is selected from a plurality of predefined behaviors. At block 635, the system performs a first predefined action responsive to identifying the first behavior.

In some embodiments, performing the first predefined action in block 635 comprises (block 645) the system determining a first region of a plurality of predefined regions corresponding to the location information. In block 655, the system accesses a memory storing predefined relationship information between the plurality of predefined behaviors and the plurality of predefined regions. The predefined relationship information comprises a plurality of predefined actions. In block 665, the system selects, using at least the first behavior and the first region, the first predefined action from the plurality of predefined actions. Method 600 ends following completion of blocks 665 and 635.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system."

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g., an amount of storage space consumed by a user or a number of virtualized systems instantiated by the user). A user can access any of the resources that reside in the cloud at any time, and from anywhere across the Internet. In context of the present disclosure, a user may access applications (e.g., a retail store app for a mobile computing device) or related data (e.g., compiled shopping data) available in the cloud. Doing so allows a user to access this information from any computing system attached to a network connected to the cloud (e.g., the Internet).

While the foregoing is directed to embodiments of the present disclosure, other and further embodiments of the disclosure may be devised without departing from the basic scope thereof, and the scope thereof is determined by the claims that follow.

What is claimed is:

1. A computer-implemented method for use with an environment divided into a plurality of regions, the computer-implemented method comprising:
   acquiring, using one or more visual sensors disposed within the environment, first image information indicative of a first person in the environment, wherein the one or more visual sensors are operatively connected to one or more computer processors;
   identifying, based on image analysis performed on the first image information by the one or more computer processors, a first behavior of the first person within the environment, wherein the first behavior relates to a first item in the environment, wherein the first item is selected from a purchasable item and a purchased item;
   determining a time at which the first behavior is performed;
   determining location information for the first person within the environment;
   determining a first region, of the plurality of regions, corresponding to the location information; and
   providing, to the first person, assistance relating to the first item, by performing a first responsive action by one or more modules, wherein the first responsive action is determined based on at least (i) the first behavior, (ii) the time relative to one or more time-of-day criteria, and (iii) the first region;

wherein the one or more modules are configured such that, responsive to the first behavior being performed at a different time or in a different region, no responsive action or a second responsive action is performed by the one or more modules.

2. The computer-implemented method of claim 1 further comprising accessing predefined relationship information, wherein the predefined relationship information specifies, for the first behavior:
the first responsive action when the location information indicates that the first person is in the first region; and
the second responsive action when the location information indicates that the first person is in the different region, the different region comprising a second region of the plurality of regions.

3. The computer-implemented method of claim 2, wherein the predefined relationship information specifies, for the first behavior:
no action is to be performed when the location information indicates that the first person is in a third region of the plurality of regions.

4. The computer-implemented method of claim 1, further comprising accessing predefined relationship information, wherein the predefined relationship information comprises one or more default relationships and one or more person-specific relationships, wherein the one or more person-specific relationships are specific to the first person and configured to override the one or more default relationships, the computer-implemented method further comprising:
acquiring, using the one or more visual sensors, second image information indicative of a second person in the environment; and
responsive to determining an association between the first person and the second person, applying the one or more person-specific relationships to the second person.

5. The computer-implemented method of claim 1, further comprising accessing predefined relationship information, wherein the predefined relationship information comprises one or more default relationships and one or more interpersonal relationships, the computer-implemented method further comprising:
acquiring, using the one or more visual sensors, second image information indicative of a second person in the environment; and
responsive to determining that the first person and the second person are located within a predefined distance of one another, enabling the one or more interpersonal relationships to override the one or more default relationships.

6. The computer-implemented method of claim 1, wherein the environment comprises a retail environment, wherein the first region is a secured region that is selectively secured by a security device, and wherein the first responsive action comprises generating control signals for the security device, causing the first region to be one of: (i) accessible by the first person via the security device, and (ii) inaccessible by the first person via the security device.

7. The computer-implemented method of claim 6, wherein the one or more modules are further configured to, when the time is before the one or more time-of-day criteria, cause the first region to be inaccessible by the first person via the security device;
wherein the one or more modules are further configured to, when the time is after the one or more time-of-day criteria, cause the first region to be accessible by the first person via the security device.

8. The computer-implemented method of claim 7, further comprising accessing predefined relationship information, wherein the first responsive action is determined based on the predefined relationship information, the predefined relationship information specifying, for the first behavior:
the first responsive action when the location information indicates that the first person is in the first region at the determined time; and
the second responsive action when the location information indicates that the first person is in the first region at a second time comprising the different time.

9. The computer-implemented method of claim 8, the predefined relationship information further specifying, for the first behavior:
a third responsive action when the location information indicates that the first person is the different region, the different region comprising a second region of the plurality of regions;
no responsive action is to be performed when the location information indicates that the first person is in a third region of the plurality of regions; and
no responsive action is to be performed when the location information indicates that the first person is in the first region at a third time.

10. The computer-implemented method of claim 9, wherein the predefined relationship information further specifies one or more default relationships and one or more person-specific relationships, wherein the one or more person-specific relationships are specific to the first person and configured to override the one or more default relationships, the computer-implemented method further comprising:
acquiring, using the one or more visual sensors, second image information indicative of a second person in the environment; and
responsive to determining an association between the first person and the second person, applying the one or more person-specific relationships to the second person, wherein the association between the first person and the second person is specified in personal profile information stored for the first person.

11. The computer-implemented method of claim 10, wherein the predefined relationship information further specifies one or more interpersonal relationships, the computer-implemented method further comprising:
acquiring, using the one or more visual sensors, third image information indicative of a third person in the environment;
responsive to determining that the first person and the third person are located within a predefined distance of one another, enabling, by the one or more modules, the one or more interpersonal relationships to override the one or more default relationships;
wherein the one or more modules are configured such that, responsive to determining that the first person and the third person are not located within the predefined distance of one another, the one or more interpersonal relationships are disabled from overriding the one or more default relationships.

12. A computer program product for use with an environment divided into a plurality of regions, the computer program product comprising:
a non-transitory computer-readable medium having embodied therewith computer-readable program code of one or more modules, the computer-readable program code executable by one or more computer processors to perform an operation that includes:

acquiring, using one or more visual sensors disposed within the environment, first image information indicative of a first person in the environment, wherein the one or more visual sensors are operatively connected to one or more computer processors;

identifying, based on image analysis performed on the first image information, a first behavior of the first person within the environment, wherein the first behavior relates to a first item in the environment, wherein the first item is selected from a purchasable item and a purchased item;

determining a time at which the first behavior is performed;

determining location information for the first person within the environment;

determining a first region, of the plurality of regions, corresponding to the location information; and providing, to the first person, assistance relating to the first item, by performing a first responsive action by the one or more modules, wherein the first responsive action is determined based on at least (i) the first behavior, (ii) the time relative to one or more time-of-day criteria, and (iii) the first region;

wherein the one or more modules are configured such that, responsive to the first behavior being performed at a different time or in a different region, no responsive action or a second responsive action is performed by the one or more modules.

13. The computer program product of claim 12, the operation further including accessing predefined relationship information, wherein the predefined relationship information specifies, for the first behavior:

the first responsive action when the location information indicates that the first person is in the first region; and the second responsive action when the location information indicates that the first person is in the different region, the different region comprising a second region of the plurality of regions.

14. The computer program product of claim 13, wherein the predefined relationship information specifies, for the first behavior:

no action is to be performed when the location information indicates that the first person is in a third region of the plurality of regions.

15. The computer program product of claim 12, the operation further including accessing predefined relationship information, wherein the predefined relationship information comprises one or more default relationships, and one or more person-specific relationships, wherein the one or more person-specific relationships are specific to the first person and configured to override the one or more default relationships, the operation further including:

acquiring, using the one or more visual sensors, second image information indicative of a second person in the environment; and responsive to determining an association between the first person and the second person, applying the one or more person-specific relationships to the second person.

16. The computer program product of claim 12, the operation further including accessing predefined relationship information, wherein the predefined relationship information comprises one or more default relationships and one or more interpersonal relationships, the operation further including:

acquiring, using the one or more visual sensors, second image information indicative of a second person in the environment; and responsive to determining that the first person and the second person are located within a predefined distance of one another, enabling the one or more interpersonal relationships to override the one or more default relationships.

17. A system for use with an environment divided into a plurality of regions, the system comprising:

one or more computer processors;

one or more visual sensors disposed within the environment and operatively connected to the one or more computer processors; and a memory containing program code which, when executed by the one or more computer processors, performs an operation comprising:

acquiring, using the one or more visual sensors, first image information indicative of a first person in the environment;

identifying, based on image analysis performed on the first image information, a first behavior of the first person within the environment, wherein the first behavior relates to a first item in the environment, wherein the first item is selected from a purchasable item and a purchased item;

determining a time at which the first behavior is performed;

determining location information for the first person within the environment;

determining a first region, of the plurality of regions, corresponding to the location information; and providing, to the first person, assistance relating to the first item, by performing a first responsive action by one or more modules, wherein the first responsive action is determined based on at least (i) the first behavior, (ii) the time relative to one or more time-of-day criteria, and (iii) the first region;

wherein the one or more modules are configured such that, responsive to the first behavior being performed at a different time or in a different region, no responsive action or a second responsive action is performed by the one or more modules.

18. The system of claim 17, the operation further comprising accessing predefined relationship information, wherein the predefined relationship information specifies, for the first behavior:

the first responsive action when the location information indicates that the first person is in the first region; and the second responsive action when the location information indicates that the first person is in the different region, the different region comprising a second region of the plurality of regions.

19. The system of claim 18, wherein the predefined relationship information specifies, for the first behavior:

no action is to be performed when the location information indicates that the first person is in a third region of the plurality of regions.

20. The system of claim 17, the operation further comprising accessing predefined relationship information, wherein the predefined relationship information comprises one or more default relationships, and one or more person-specific relationships, wherein the one or more person-specific relationships are specific to the first person and configured to override the one or more default relationships, the operation further comprising:

acquiring, using the one or more visual sensors, second image information indicative of a second person in the environment; and
responsive to determining an association between the first person and the second person, applying the one or more person-specific relationships to the second person.

* * * * *

UNITED STATES PATENT AND TRADEMARK OFFICE
CERTIFICATE OF CORRECTION

PATENT NO. : 10,691,931 B2
APPLICATION NO. : 15/724497
DATED : June 23, 2020
INVENTOR(S) : Dean Frederick Herring et al.

Page 1 of 1

It is certified that error appears in the above-identified patent and that said Letters Patent is hereby corrected as shown below:

In the Claims

In Column 15, Line 6, in Claim 2, after "1" insert -- , --.

In Column 16, Line 17, in Claim 9, after "person is" insert -- in --.

Signed and Sealed this
Tenth Day of September, 2024

Katherine Kelly Vidal
*Director of the United States Patent and Trademark Office*